(12) United States Patent
Arakawa et al.

(10) Patent No.: US 9,293,131 B2
(45) Date of Patent: Mar. 22, 2016

(54) VOICE ACTIVITY SEGMENTATION DEVICE, VOICE ACTIVITY SEGMENTATION METHOD, AND VOICE ACTIVITY SEGMENTATION PROGRAM

(75) Inventors: Takayuki Arakawa, Tokyo (JP); Daisuke Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 477 days.

(21) Appl. No.: 13/814,141

(22) PCT Filed: Aug. 2, 2011

(86) PCT No.: PCT/JP2011/068003
§ 371 (c)(1),
(2), (4) Date: Feb. 4, 2013

(87) PCT Pub. No.: WO2012/020717
PCT Pub. Date: Feb. 16, 2012

(65) Prior Publication Data
US 2013/0132078 A1 May 23, 2013

(30) Foreign Application Priority Data

Aug. 10, 2010 (JP) .................................. 2010-179180

(51) Int. Cl.
*G10L 15/20* (2006.01)
*G10L 15/04* (2013.01)
(Continued)

(52) U.S. Cl.
CPC ................. *G10L 15/04* (2013.01); *G10L 25/78* (2013.01); *G10L 25/87* (2013.01)

(58) Field of Classification Search
CPC ........ G10L 25/78; G10L 25/786; G10L 25/87
See application file for complete search history.

(56) References Cited

U.S. PATENT DOCUMENTS 4,239,936 A * 12/1980 Sakoe ........................... 704/233
6,044,342 A 3/2000 Sato et al.
(Continued)

FOREIGN PATENT DOCUMENTS

JP H10-210075 A 8/1998
JP 2006209069 A 8/2006
(Continued)

OTHER PUBLICATIONS

The international search report for PCT/JP2011/068003 mailed on Sep. 6, 2011.
(Continued)

*Primary Examiner* — Brian Albertalli

(57) ABSTRACT

Provided is a noise-robust voice activity segmentation device which updates parameters used in the determination of voice-active segments without burdening the user, and also provided are a voice activity segmentation method and a voice activity segmentation program.

The voice activity segmentation device comprises: a first voice activity segmentation means for determining a voice-active segment (first voice-active segment) and a voice-inactive segment (first voice-inactive segment) in a time-series of input sound by comparing a threshold value and a feature value of the time-series of the input sound; a second voice activity segmentation means for determining, after a reference speech acquired from a reference speech storage means has been superimposed on a time-series of the first voice-inactive segment, a voice-active segment and a voice-inactive segment in the time-series of the superimposed first voice-inactive segment by comparing the threshold value and a feature value of the time-series of the superimposed first voice-inactive segment; and a threshold value update means for updating the threshold value in such a way that a discrepancy rate between the determination result of the second voice activity segmentation means and a correct segmentation calculated from the reference speech is decreased.

10 Claims, 10 Drawing Sheets

(51) Int. Cl.
*G10L 25/87* (2013.01)
*G10L 25/78* (2013.01)

(56) References Cited

U.S. PATENT DOCUMENTS

| | | | |
|---|---|---|---|
| 6,249,757 B1* | 6/2001 | Cason | 704/214 |
| 6,453,291 B1* | 9/2002 | Ashley | 704/233 |
| 6,490,554 B2* | 12/2002 | Endo et al. | 704/215 |
| 2002/0103636 A1* | 8/2002 | Tucker et al. | 704/205 |
| 2005/0177362 A1* | 8/2005 | Toguri | 704/208 |
| 2006/0161430 A1* | 7/2006 | Schweng | 704/233 |
| 2009/0076814 A1* | 3/2009 | Lee | 704/233 |
| 2009/0138260 A1* | 5/2009 | Terao | 704/219 |
| 2011/0251845 A1 | 10/2011 | Arakawa et al. | |
| 2012/0271634 A1* | 10/2012 | Lenke | 704/251 |

FOREIGN PATENT DOCUMENTS

| | | |
|---|---|---|
| JP | 2007017620 A | 1/2007 |
| WO | WO 03054856 A1 * | 7/2003 |
| WO | 2010070840 A | 6/2010 |

OTHER PUBLICATIONS

ETSI EN 301 708 V7.1.1, 1999.

ITU-T G.728 Annex B, 1996.

A.Lee, K.Nakamura, R.Nishimura, H.Saruwatari, K.Shikano, "Noise Robust Real World Spoken Dialog System using GMM Based Rejection of Unintended Inputs," ICSLP-2004, vol. I, pp. 173-176, Oct. 2004.

* cited by examiner

VOICE ACTIVITY SEGMENTATION DEVICE, VOICE ACTIVITY SEGMENTATION METHOD, AND VOICE ACTIVITY SEGMENTATION PROGRAM

This application is a National Stage Entry of PCT/JP2011/068003 filed Aug. 2, 2011, which claims priority from Japanese Patent Application 2010-179180 filed Aug. 10, 2010, the contents of all of which are incorporated herein by reference, in their entirety.

TECHNICAL FIELD

The present invention relates to a voice activity segmentation device, a voice activity segmentation method, and a voice activity segmentation program.

BACKGROUND ART

The voice activity segmentation technology is used in order to improve speech transmission efficiency through removing or compressing a voice-inactive segment in which a speaker does not speak in mobile communication or the like.

Moreover, the voice activity segmentation technology is used by a noise canceller, an echo canceller or the like in order to estimate noise in the voice-inactive segment.

Moreover, the voice activity segmentation technology is used widely by a speech recognition system in order to improve performance and to reduce an amount of processing.

A general voice activity segmentation system calculates a feature value of a time-series of inputted sound per a unit time, and determines a voice-active segment and a voice-inactive segment in the time-series of the inputted sound by comparing the feature value with a threshold value.

The feature value which is used in the voice activity segmentation will be exemplified in the following. For example, a patent document 1 discloses that, after smoothing fluctuation of power spectrum, the smoothed power spectrum is used as the feature value.

A non-patent document 1 discloses that an average value of SNR shown in section 4.3.3 and SNR shown in section 4.3.5 is used as the feature value.

In addition to the feature values mentioned above, many feature values are used. For example, number of zero crossing points shown in section B.3.1.4 of a non-patent document 2, a likelihood ratio by use of speech GMM (Gaussian Mixture Model) and sound-free GMM shown in a non-patent document 3, a combination of plural feature values shown in the patent document 2 or the like is exemplified.

A patent document 2 discloses a method of urging a user to utter a reference speech, carrying out compulsory alignment to the utterance, determining a voice-active segment and a voice-inactive segment, and updating weights, which are assigned to a plurality of the feature values, so that determination error on the voice-active segment and the voice-inactive segment may be minimum.

PRECEDING TECHNICAL DOCUMENT

Patent Document

[Patent document 1] Japanese Patent Application Laid-Open No. 2006-209069
[Patent document 2] Japanese Patent Application Laid-Open No. 2007-017620

Patent Document

[Non-patent document 1] ETSI EN 301 708 V7.1.1
[Non-patent document 2] ITU-T G.729 Annex B
[Non-patent document 3] A. Lee, K. Nakamura, R. Nishimura, H. Saruwatari, and K. Shikano, "Noise Robust Real World Spoken Dialog System using GMM Based Rejection of Unintended Inputs," ICSLP-2004, Vol. I, pp. 173-176, October 2004.

BRIEF SUMMARY OF THE INVENTION

Problem to be Solved by the Invention

However, the above-mentioned voice activity segmentation system has a problem of burdening the user with an additional load because of urging the user to utter the reference speech. Moreover, in the case that an amount of the utterance is less, there is a problem that it is impossible to update parameters, which are used in the voice activity segmentation, with sufficient accuracy.

For this reason, an object of the present invention is to provide a voice activity segmentation device, a voice activity segmentation method, and a voice activity segmentation program, which update the parameters used in the voice activity segmentation without burdening the user and which are robust against the noise, in order to solve the problem mentioned above.

Means to Solve the Problem

To achieve the above-described object, a voice activity segmentation device comprises: a first voice activity segmentation means for determining a voice-active segment (first voice-active segment) and a voice-inactive segment (first voice-inactive segment) in a time-series of input sound by comparing a threshold value and a feature value of the time-series of the input sound; a second voice activity segmentation means for determining, after a reference speech acquired from a reference speech storage means has been superimposed on a time-series of the first voice-inactive segment, a voice-active segment and a voice-inactive segment in the time-series of the superimposed first voice-inactive segment by comparing the threshold value and a feature value of the time-series of the superimposed first voice-inactive segment; and a threshold value update means for updating the threshold value in such a way that a discrepancy rate between the determination result of the second voice activity segmentation means and a correct segmentation calculated from the reference speech is decreased.

To achieve the above-described object, a voice activity segmentation program which makes a computer execute: a first voice activity segmentation step for determining a voice-active segment (first voice-active segment) and a voice-inactive segment (first voice-inactive segment) in a time-series of input sound by comparing a threshold value and a feature value of the time-series of the input sound; a second voice activity segmentation step for determining, after a reference speech acquired from a reference speech storage means has been superimposed on a time-series of the first voice-inactive segment, a voice-active segment and a voice-inactive segment in the time-series of the superimposed first voice-inactive segment are determined by comparing the threshold value and a feature value of the time-series of the superimposed first voice-inactive segment; and a threshold value update step for updating the threshold value in such a way that a discrepancy rate between the determination result obtained in the second voice activity segmentation step and a correct segmentation calculated from the reference speech is decreased.

To achieve the above-described object, a voice activity segmentation method comprises: determining a voice-active segment (first voice-active segment) and a voice-inactive segment (first voice-inactive segment) in a time-series of input sound by comparing a threshold value and a feature value of the time-series of the input sound; determining, after a reference speech acquired from a reference speech storage means has been superimposed on a time-series of the first voice-inactive segment, a voice-active segment and a voice-inactive segment in the time-series of the superimposed first voice-inactive segment by comparing the threshold value and a feature value of the time-series of the superimposed first voice-inactive segment; and updating the threshold value in such a way that a discrepancy rate between the determination result on the voice-active segment and the voice-inactive segment in the time-series of the superimposed first voice-inactive segment, and a correct segmentation calculated from the reference speech is decreased.

Effect of the Invention

According to the present invention, the voice activity segmentation device, the voice activity segmentation method, and the voice activity segmentation program, which update parameters used in the voice activity segmentation without burdening the user and which are robust against noise, are provided.

EXEMPLARY EMBODIMENT TO CARRY OUT THE INVENTION

Hereinafter, an exemplary embodiment according to the present invention will be described with reference to a drawing. A common component in all drawings is assigned a common code and description on the common component is omitted appropriately.

Here, each unit included in a voice activity segmentation device 1 of each exemplary embodiment is a control unit, a memory, a program which is loaded in the memory, a storage unit such as a hard disk which stores the program, a network connection interface or the like, and each unit of the voice activity segmentation device 1 is realized by any combination of hardware and software. As far as there is no specific note, there is no limitation in a method and an apparatus for realizing each the unit.

The control unit, which includes a CPU (Central Processing Unit: abbreviated similarly in the following) or the like, not only controls a whole of the voice activity segmentation device 1 through working an operation system, but also makes a program and data read from a storage medium which is mounted on, for example, a drive device, and inputs the program and the data into the memory, and carries out various processes according to the program and the data.

The storage medium, which is, for example, an optical disk, a flexible disk, a magneto-optical disk, an external hard disk, a semiconductor memory or the like, stores a computer program so that a computer may read the computer program. Moreover, it may be preferable that the computer program is downloaded from an external computer which is connected with a communication network and which is not shown in the figure.

A block diagram used in description of each the exemplary embodiment does not show a configuration of each hardware unit but shows blocks of function units. Each function block is realized by any combination of hardware and software. Moreover, while it may be described in the figure in some cases that the constituent unit according to each exemplary embodiment is realized by one apparatus which is physically combined, a means for realizing the constituent unit is not limited to this case. That is, it may be preferable that the constituent unit is divided into a plurality of parts which are separated physically each other, and a plurality of the parts are connected each other through a wire or radio and realize the system according to each the exemplary embodiment.

First Exemplary Embodiment

Next, a first exemplary embodiment according to the present invention will be described.

Figure 1:
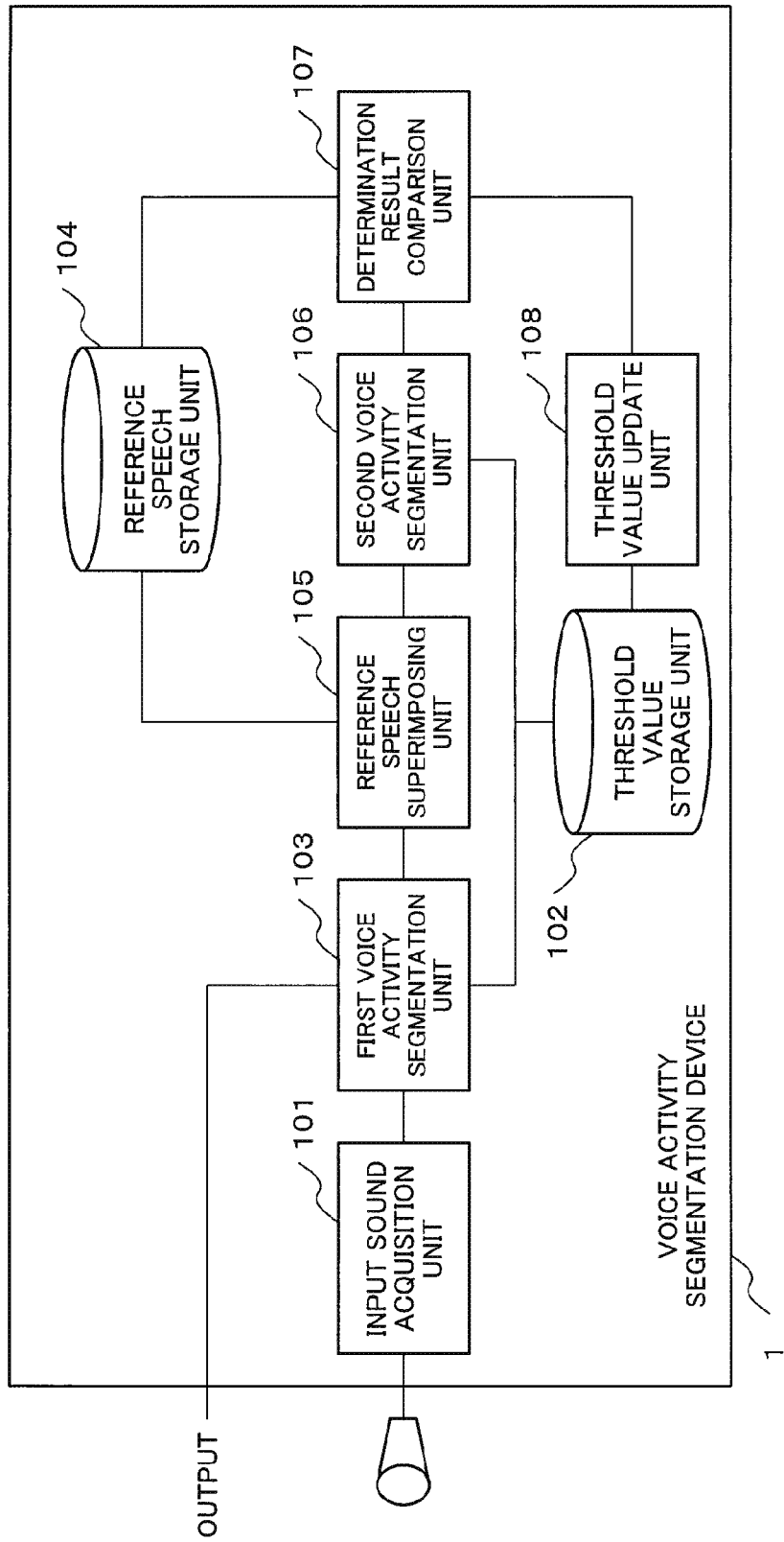
FIG. 1 is a block diagram showing an example of a configuration according to a first exemplary embodiment of the present invention.

FIG. 1 shows a configuration according to the first exemplary embodiment of the present invention. With reference to FIG. 1, the voice activity segmentation device 1 according to the first exemplary embodiment of the present invention includes an input sound acquisition unit 101, a threshold value storage unit 102, a first voice activity segmentation unit 103, a reference speech storage unit 104, a reference speech superimposing unit 105, a second voice activity segmentation unit 106, a determination result comparison unit 107 and a threshold value update unit 108.

Specifically, the input sound acquisition unit 101 is realized by a dedicated apparatus made of a logic circuit, or by a CPU of an information processing apparatus which carries out a program, etc. For example, the input sound acquisition unit 101 is configured so as to be connected with equipment such as a microphone or so as to be united in one unit with the equipment such as the microphone, and so as to acquire a time-series of input sound.

Specifically, the threshold value storage unit 102 is realized by a storage apparatus such as an optical disk apparatus, a magnetic disk apparatus or the like. The threshold value storage unit 102 is configured so as to store a threshold value related to voice activity segmentation. Specifically, the threshold value storage unit 102 stores the threshold value which is used when the first voice activity segmentation unit 103 determines whether the time-series of the input sound is in a voice-active segment or a voice-inactive segment.

Figure 3:
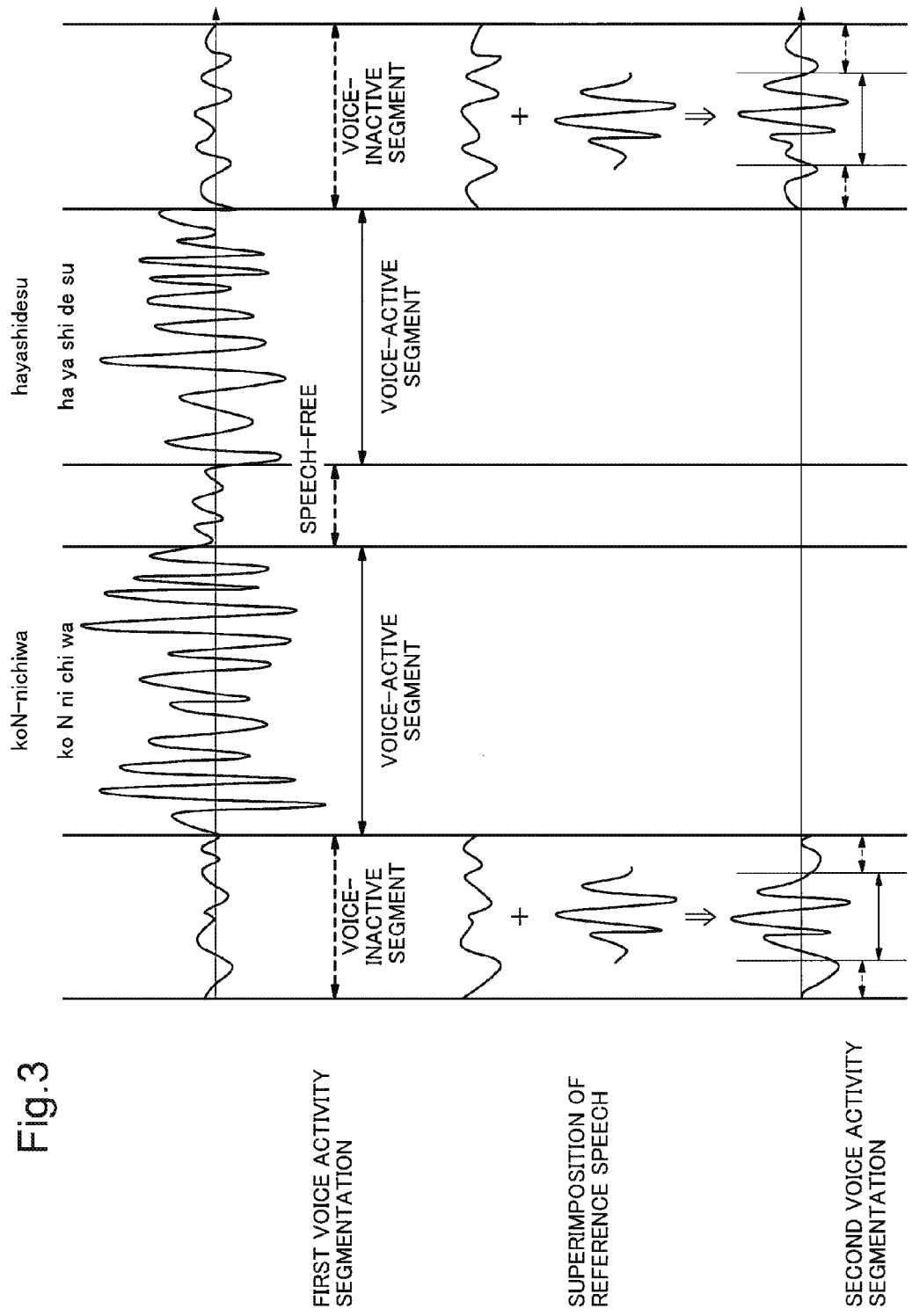
FIG. 3 explains an example according to the exemplary embodiment of the present invention.

Specifically, the first voice activity segmentation unit 103 is realized by a dedicated apparatus made of a logic circuit, or by a CPU of an information processing apparatus which carries out a program, etc. The first voice activity segmentation unit 103 is configured so as to determine by use of the threshold value, which the threshold value storage unit 102 stores, whether the time-series of the input sound, which the input sound acquisition unit 101 acquires, is in the voice-active segment or the voice-inactive segment. A segment which the first voice activity segmentation unit 103 determines as the voice-active segment is defined as a first voice-active segment, and a segment which the first voice activity segmentation unit 103 determines as the voice-inactive segment is defines as a first voice-inactive segment. FIG. 3 exemplifies that the first voice activity segmentation unit 103 divides the time-series of the input sound into a speech in the voice-active segment (first voice-active segment) and a speech in the voice-inactive segment (first voice-inactive segment).

Specifically, the reference speech storage unit 104 is realized by a storage apparatus such as an optical disk apparatus, a magnetic disk apparatus or the like. The reference speech storage unit 104 stores contents of speech data (reference speech) which is corresponding to contents of an utterance and which is known in advance, and information on a duration time (duration length) which is known in advance.

Specifically, the reference speech superimposing unit 105 is realized by a dedicated apparatus made of a logic circuit, or by a CPU of an information processing apparatus which carries out a program, etc. The reference speech superimposing unit 105 is configured so as to superimpose the reference speech, which the reference speech storage unit 104 stores, on the time-series of the input sound which is estimated to be in the voice-inactive segment by the first voice activity segmentation unit 103. A detailed operation of the reference speech superimposing unit 105 will be described later.

Specifically, the second voice activity segmentation unit 106 is realized by a dedicated apparatus made of a logic circuit, or by a CPU of an information processing apparatus which carries out a program, etc. The second voice activity segmentation unit 106 is configured so as to determine by second use of the threshold value, which the threshold value storage unit 102 stores, whether the time-series of the input sound on which the reference sound superimposing unit 105 superimposes the reference speech (the time-series of the input sound which the first voice activity segmentation unit 103 determines as the voice-inactive segment and on which the reference speech is superimposed afterward) is in the voice-active segment or in the voice-inactive segment.

Specifically, the determination result comparison unit 107 is realized by a dedicated apparatus made of a logic circuit, or by a CPU of an information processing apparatus which carries out a program, etc. The determination result comparison unit 107 is configured so as to compare the determination result, which the second voice activity segmentation unit 106 determines, with a correct length of the voice-active segment and a correct length of the voice-inactive segment (a correct segmentation) which are determined by the length information on the reference speech stored in the threshold value storage unit 102, and so as to output the comparison result to the threshold value update unit 108. A method for updating the threshold value will be described later.

Specifically, the threshold value update unit 108 is realized by a dedicated apparatus made of a logic circuit, or by a CPU of an information processing apparatus which carries out a program, etc. The threshold value update unit 108 is configured so as to update the threshold value, which the threshold value storage unit 102 stores, on the basis of the comparison result which the determination result comparison unit 107 outputs.

Next, an operation according to the exemplary embodiment will be described with reference to FIG. 1, a flow chart shown in FIG. 2, and FIG. 3.

Figure 2:
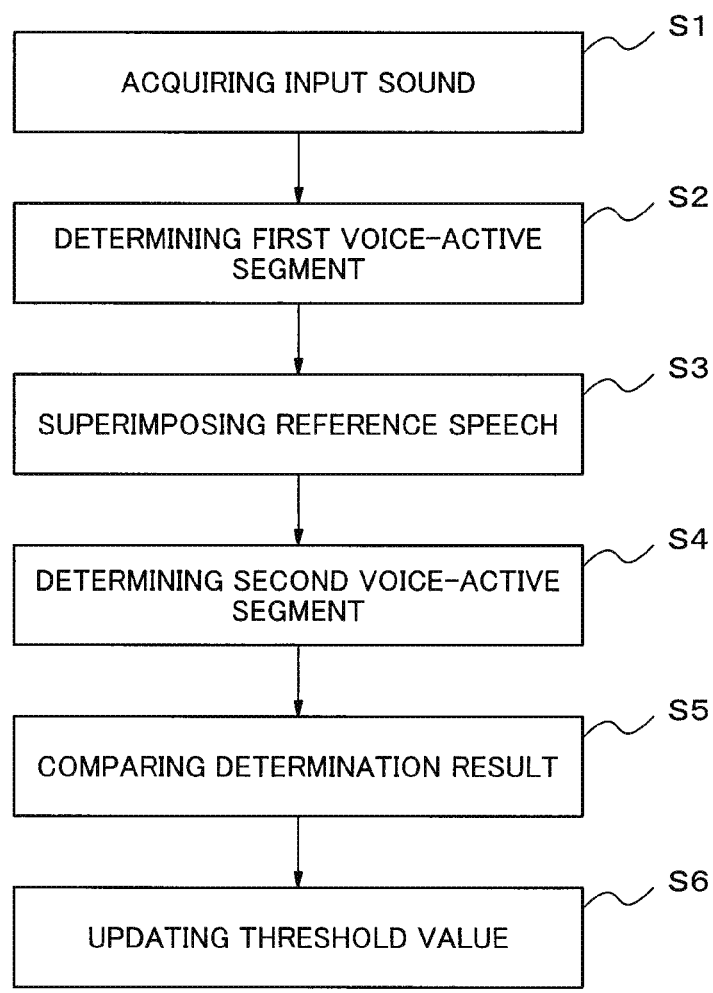
FIG. 2 is a block diagram showing an example of a configuration according to the first exemplary embodiment of the present invention.

First, the input sound acquisition unit 101 acquires the time-series of the input sound (Step S1 in FIG. 2). It may be preferable that the input sound acquisition unit 101 acquires, for example, digital data generated through digitizing analog data, which is acquired by a microphone or the like, on the basis of sampling frequency 8000 Hz and 16 bit accuracy Linear-PCM, as the time-series of the input sound.

Next, the first voice activity segmentation unit 103 determines whether the time-series of the input sound is in the first voice-active segment or in the first voice-inactive segment (Step S2 in FIG. 2). According to the example shown in FIG. 3, segments of "kon N ni chi wa" and "ha ya shi de su" are corresponding to the voice-active segment. Furthermore, segments just before and just after the segment of "kon N nichi wa", and a segment just after the segment of "ha ya shi de su" are corresponding to the voice-inactive segment. It may be preferable that the first voice activity segmentation unit 103 calculates a feature value, which indicates probability of speech sound, per a short unit time, for example, per 10 milliseconds on the basis of the time-series of the input sound, and compares the feature value with the threshold value which is stored in the threshold value storage unit 102, and uses the comparison result for determination of the voice-active segment. It may be preferable that the first voice activity segmentation unit 103 uses, for example, amplitude power as the feature value which indicates the probability of speech sound. For example, the amplitude power Pt is calculated by use of the following (formula 1).

$$P_t = \frac{1}{N} \sum_{i=t}^{t+N-1} x_i^2 \qquad \text{(Formula 1)}$$

In the (formula 1), N is number of sample points per a unit time. Moreover, xt is a value of the input sound data (waveform data) at a time t. For example, the first voice activity segmentation unit 103 determines the case in which the amplitude power is larger than a threshold value as being in a state of voice-active, and determines the case in which the amplitude power is smaller than the threshold value as being in a state of voice-inactive. Here, while the first voice activity segmentation unit 103 uses the amplitude power as the feature value which indicates the probability of speech sound, it may be preferable that the first voice activity segmentation unit 103 uses another feature value such as the number of zero crossing points, a ratio of likelihood of a voice-active model to likelihood of a voice-inactive model, a pitch frequency, a SN ratio or the like.

The first voice activity segmentation unit 103 determines that a segment in which the same state, which is determined for each unit time, out of the states of voice-active and the states of voice-inactive continues is the voice-active segment or the voice-inactive segment. A start point of the voice-active segment is corresponding to a point of time when the continuous state of voice-inactive is stopped and changed to the state of voice-active. The point of time is also corresponding to an end point of the segment of the state of voice-inactive.

Moreover, an end point of the voice-active segment is corresponding to a point of time when the continuous state of voice-active is stopped and changed to the state of voice-inactive. The point of time is also corresponding to a start point of the voice-inactive segment. As mentioned above, when the continuous state is stopped, the voice-active segment and the voice-inactive segment are fixed.

Here, in order to prevent generating the short voice-active segment or the short voice-inactive segment, it may be preferable to carry out a hangover process that the first voice activity segmentation unit 103 does not admit the start of the voice-active segment (end of the voice-inactive segment) as far as it is not determined that the state of voice-active continues for a predetermined time after the change from the state of voice-inactive to the state of voice-active, or does not admit the end of the voice-active segment (start of the voice-inactive segment) as far as it is not determined that the state of voice-inactive continues for a predetermined time after the change from the state of voice-active to the state of voice-inactive.

Next, the reference speech superimposing unit 105 superimposes the reference speech on the time-series of the input sound which is determined as the voice-inactive segment by the first speech determination unit 103 (Step S3 in FIG. 2). It may be preferable that the reference speech superimposing unit 105 calculates a summation for each sample point as shown in the following (formula 2).

$$z_t = x_t + y_t \quad \text{(Formula 2)}$$

In the (formula 2), xt, yt and zt denote the time-series of the input sound, a time-series of the reference speech, and a time-series after superimposition respectively.

Here, it may be preferable that the reference speech superimposing unit 105 selects a reference speech, which is superimposed, according to the length of the voice-inactive segment out of plural reference speeches each of which has different length and which are prepared in the reference speech storage unit 104. Moreover, in the case that the length of the voice-inactive segment is longer than a predetermined length, it may be preferable that the reference speech superimposing unit 105 superimposes the reference speech plural times. Moreover, in the case that the length of the voice-inactive segment is shorter than a predetermined length, it may be preferable that the reference speech superimposing unit 105 does not superimpose the speech on the voice-inactive segment. According to the example shown in FIG. 3, the reference speech superimposing unit 105 superimposes the reference speech on the first voice-inactive segment and the third voice-inactive segment, but does not superimpose the reference speech on the second voice-inactive segment since the length of the second voice-inactive segment is shorter than the predetermined length.

Next, the second voice activity segmentation unit 106 determines whether the time-series of the input sound on which the reference speech is superimposed is in the second voice-active segment or in the second voice-inactive segment (Step S4 in FIG. 2). A method for determining whether in the voice-active segment or in the voice-inactive segment is the same as one which is described in Step S2 shown in FIG. 2. A threshold value which the second voice activity segmentation unit 106 uses in this case is the same as one which the first voice activity segmentation unit 103 uses.

Next, the determination result comparison unit 107 compares the result on determining whether in the voice-active segment or in the voice-inactive segment with the determination result which is the correct segmentation (Step S5 in FIG. 2). In this case, the determination result comparison unit 107 compares by use of FRR (False Rejection Rate) and FAR (False Acceptance Rate).

Here, FRR is defined by the following (formula 3).

FRR=(length of segment in which speech is misjudged to be voice-inactive)/length of voice-active segment which is corresponding to correct segmentation (formula 3)

Moreover, FAR is defined by the following (formula 4).

FAR=(length of segment in which speech-free is misjudged to be voice-active)/length of voice-inactive segment which is corresponding to correct segmentation (formula 4)

It may be preferable that the determination result comparison unit 107 calculates the false rejection rate (FRR) and the false acceptance rate (FAR) for each voice-inactive segment which is determined in Step S2 shown in FIG. 2. Moreover, it may be preferable that the determination result comparison unit 107 compare the determination result by use of another discrepancy rate which indicates a degree of discrepancy on the segment.

Next, the threshold value update unit 108 updates the threshold value, which is used in the voice activity segmentation, on the basis of the comparison result (Step S6 in FIG. 2). For example, the threshold value update unit 108 updates the threshold value θ by use of the following (formula 5).

$$\theta \leftarrow \theta + \eta \times (\text{FAR} - \alpha \times \text{FRR}) \quad \text{(formula 5)}$$

Here, η is a step size in the (formula 5). α is a parameter for controlling a weight indicating which is weighted out of FRR and FAR. It may be preferable that these two parameters are set to predetermined values respectively in advance and it may be preferable that these parameters are generated according to a condition or an environment. In the case that the threshold value before the update is large excessively, it is anticipated that FRR becomes larger than FAR. In this case, the threshold value update unit 108 updates the threshold value so that the threshold value becomes smaller. Moreover, in the case that the threshold value before the update is small excessively, it is anticipated that FAR becomes larger than FRR. In this case, the threshold value update unit 108 updates the threshold value so that the threshold value becomes larger. As mentioned above, the threshold value update unit 108 updates the threshold value so that the discrepancy rate between the determination result of the second voice-active segment and the second voice-inactive segment, and the determination result which is corresponding to the correct segmentation becomes small. Here, it may be preferable that the threshold update unit 108 updates the threshold value θ by use of either FRR or FAR, and it may be preferable that the threshold update unit 108 updates the threshold value θ by use of another discrepancy rate. A method for updating the threshold value is not limited particularly.

It may be preferable that the process of Steps S1 to S6 shown in FIG. 2 is carried out every time when the user utters, or every time when the voice-active segment or the voice-inactive segment is fixed, or every time when a predetermined time elapses.

The voice activity segmentation device 1 according to the exemplary embodiment superimposes the reference speech on the time-series of the input sound which is determined as the voice-inactive segment by the first voice activity segmentation unit 103 by use of the threshold value. Furthermore, the second voice activity segmentation unit 106 divides the time-series of the input sound, on which the reference speech is superimposed, into the voice-active segment and the voice-inactive segment. It is possible that the voice activity segmentation device 1 determines whether the threshold value is appropriate through comparing the determination result of the second voice-active segment with the correct information which is obtained on the basis of the reference speech. Therefore, it is possible that the voice activity segmentation device 1 updates the threshold value, which is used in the voice activity segmentation, on the basis of the determination result so that the threshold value is appropriate. As mentioned above, it is possible that the voice activity segmentation device 1 updates the threshold value, which is used for the voice activity segmentation, by use of the time-series of the input sound acquired while a user does not utter. Therefore, it is possible that the voice activity segmentation device 1 updates the threshold value, which is used in the voice activity segmentation, without burdening the user, and carries out the voice activity segmentation which is robust against the noise.

Second Exemplary Embodiment

Next, a second exemplary embodiment according to the present invention will be described.

Figure 4:
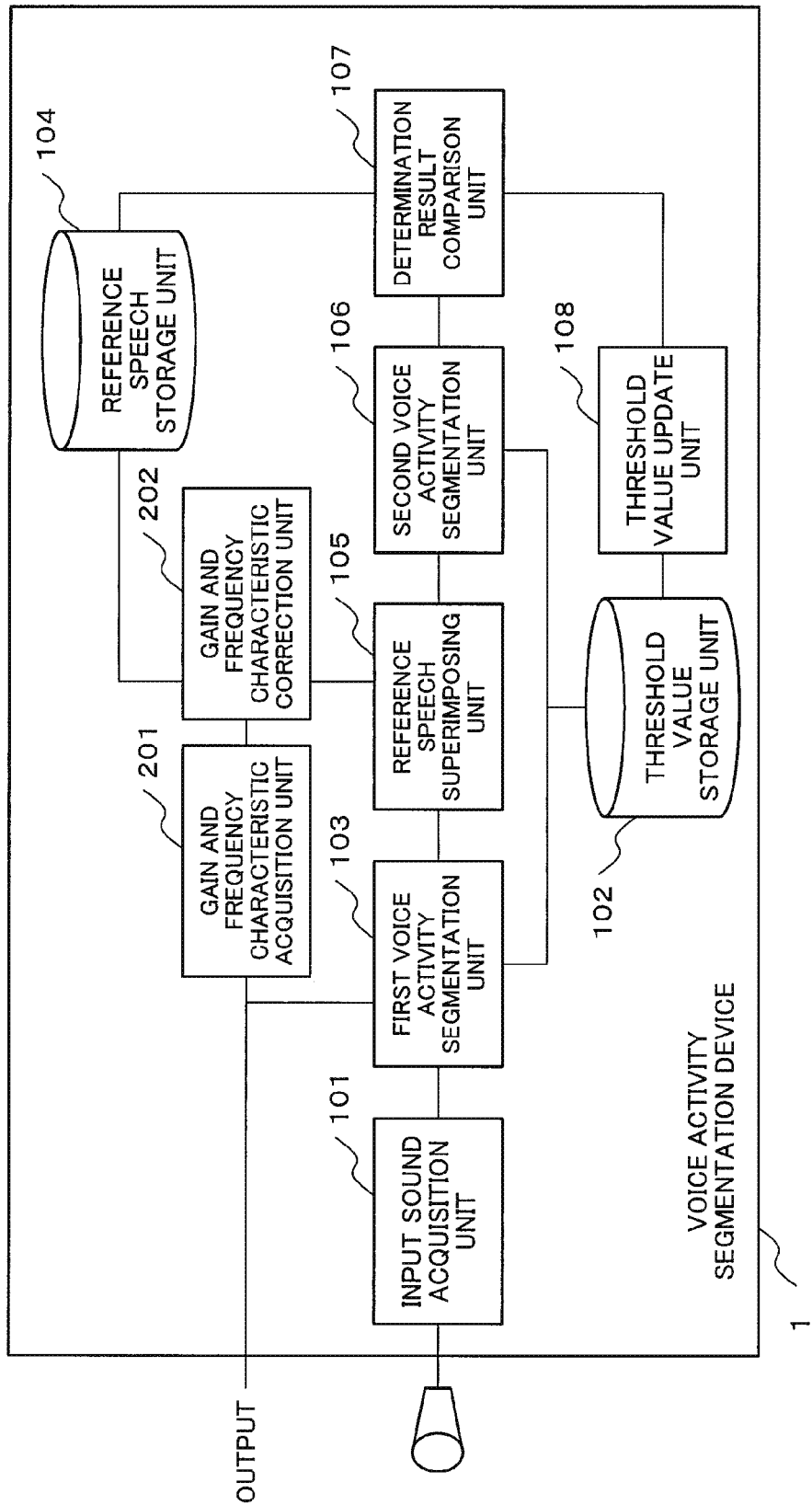
FIG. 4 is a block diagram showing an example of a configuration according to a second exemplary embodiment of the present invention.

FIG. 4 shows a configuration according to the second exemplary embodiment of the present invention. With reference to FIG. 4, the voice activity segmentation device 1 according to the second exemplary embodiment of the present invention includes a gain and frequency characteristic acquisition unit 201 and a gain and frequency characteristic correction unit 202 in addition to the components according to the first exemplary embodiment. Since each component other than the above-mentioned units is the same as one according to the first exemplary embodiment, description on the same components is omitted.

Specifically, the gain and frequency characteristic acquisition unit 201 is realized by a dedicated apparatus made of a logic circuit, or by a CPU of an information processing apparatus which carries out a program, etc. The gain and frequency characteristic acquisition unit 201 is configured so as to acquire at least one out of gain information and frequency characteristic information from the time-series of the input sound which is determined as the voice-active segment by the first voice activity segmentation unit 103.

A method for the gain and frequency characteristic acquisition unit 201's acquiring the gain will be shown in the following. For example, it may be preferable that the gain and frequency characteristic acquisition unit 201 calculates the amplitude power for each unit time by use of the above-mentioned (formula 1) and finds out an average value of the amplitude power over a whole of the voice-active segments. Or, it may be preferable that the gain and frequency characteristic acquisition unit 201 finds out the maximum value of the amplitude power over a whole of the voice-active segment.

Moreover, a method for the gain and frequency characteristic acquisition unit 201 acquiring the frequency characteristic will be shown in the following. It may be preferable that the gain and frequency characteristic acquisition unit 201 carries out, for example, Fourier transformation for each unit time and calculates the spectrum power for each frequency band and then calculates an average value for each frequency band over a whole of the voice-active segment. Or, it may be preferable that the gain and frequency characteristic acquisition unit 201 finds out the maximum value of the spectrum power for each voice-active segment.

Specifically, the gain and frequency characteristic correction unit 202 is realized by a dedicated apparatus made of a logic circuit, or by a CPU of an information processing apparatus which carries out a program, etc. The gain and frequency characteristic acquisition unit 201 is configured so as to correct a gain and a frequency characteristic of the reference speech by use of at least either the gain information or the frequency characteristic information which the gain and frequency characteristic acquisition unit 201 acquires.

A method for the gain and frequency characteristic correction unit 202 correcting the gain will be shown in the following. For example, it may be preferable that the gain and frequency characteristic correction unit 202 corrects the gain through multiplying a gain of the reference speech, which is calculated in advance, with a predetermined factor so that the gain of the reference speech, which is calculated in advance, is equal to the calculated gain of the input sound.

Moreover, a method for the gain and frequency characteristic correction unit 202 correcting the frequency characteristic will be shown in the following. For example, it may be preferable that the gain and frequency characteristic correction unit 202 corrects a frequency characteristic of the reference speech, which is calculated in advance, through multiplying the calculated frequency characteristic of the reference speech with a predetermined factor for each frequency band so that the frequency characteristic of the reference speech, which is calculated in advance, is equal to the calculated frequency characteristic of the input sound.

Next, an operation according to the exemplary embodiment will be described with reference to a flow chart shown in FIG. 5. According to the second exemplary embodiment of the present invention, after carrying out up to Step S2 shown in FIG. 2 according to the first exemplary embodiment, a process different from the process according to the first exemplary embodiment is carried out on the basis of the determination result of the first voice activity segmentation unit 103.

Figure 5:
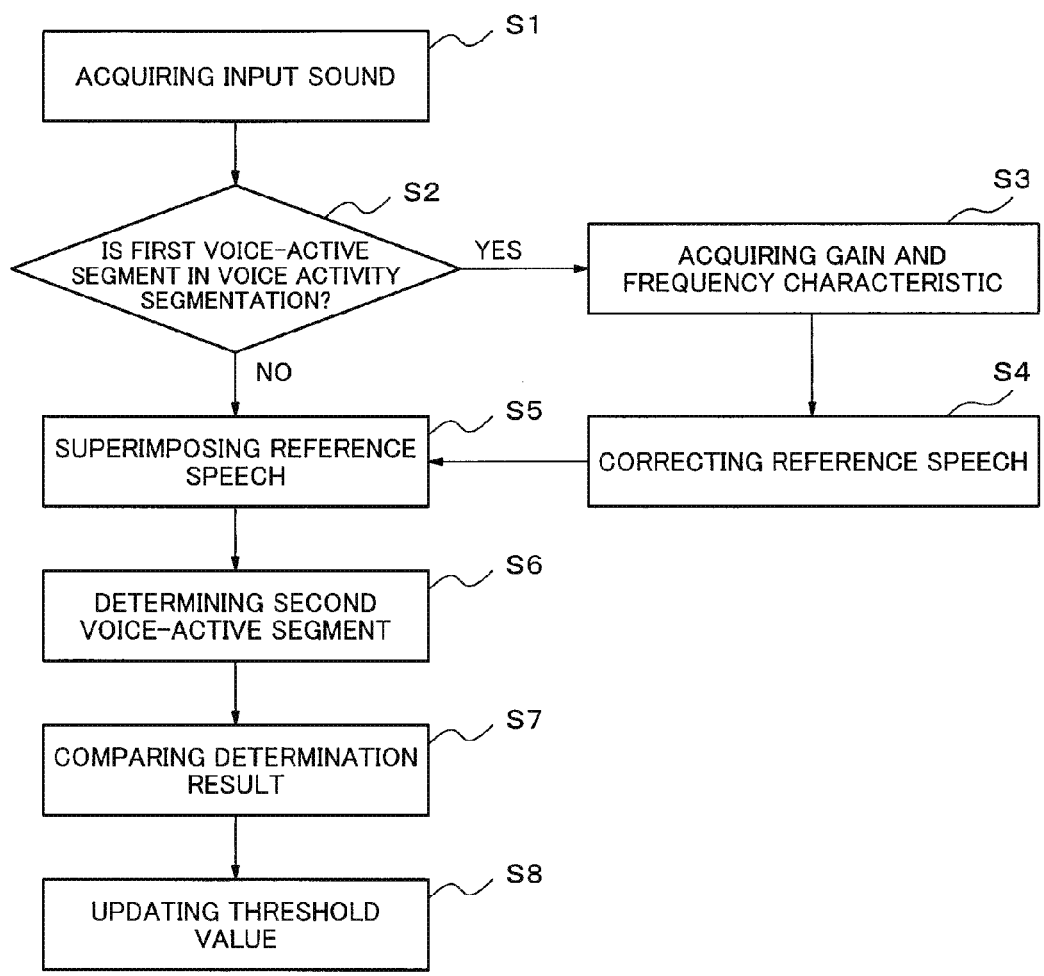
FIG. 5 shows an example of an operation according to the second exemplary embodiment of the present invention.

Specifically, the gain and frequency characteristic acquisition unit 201 acquires information on the gain and the frequency characteristic of the time-series of the input sound which the first voice activity segmentation unit 103 determines as the voice-active segment (Step S3 in FIG. 5). Then, the gain and frequency correction unit 202 corrects the reference speech by use of the information on the gain and the frequency characteristic which the gain and frequency characteristic acquisition unit 201 acquires (Step S4 of FIG. 5). The reference speech superimposing unit 105 superimposes the corrected reference speech on the time-series of the input sound which the first voice activity segmentation unit 103 determines as the voice-inactive segment (Step S5 in FIG. 5). The voice activity segmentation device 1 carries out a process which is the same as one of Step S4 and the steps after Step S4 in FIG. 2 according to the first exemplary embodiment.

The voice activity segmentation device 1 according to the exemplary embodiment acquires the information on the gain and the frequency characteristic by use of the time-series of the input sound which is determined as the voice-active segment by the first voice activity segmentation unit 103, and corrects the reference speech. As a result, it is possible that the voice activity segmentation device 1 makes the reference speech close to the speaker characteristic, which is similar to the user's utterance, and the acoustic environment. Therefore, it is possible that the voice activity segmentation device 1 according to the exemplary embodiment updates the threshold value more accurately.

Third Exemplary Embodiment

Next, a third exemplary embodiment according to the present invention will be described.

Figure 6:
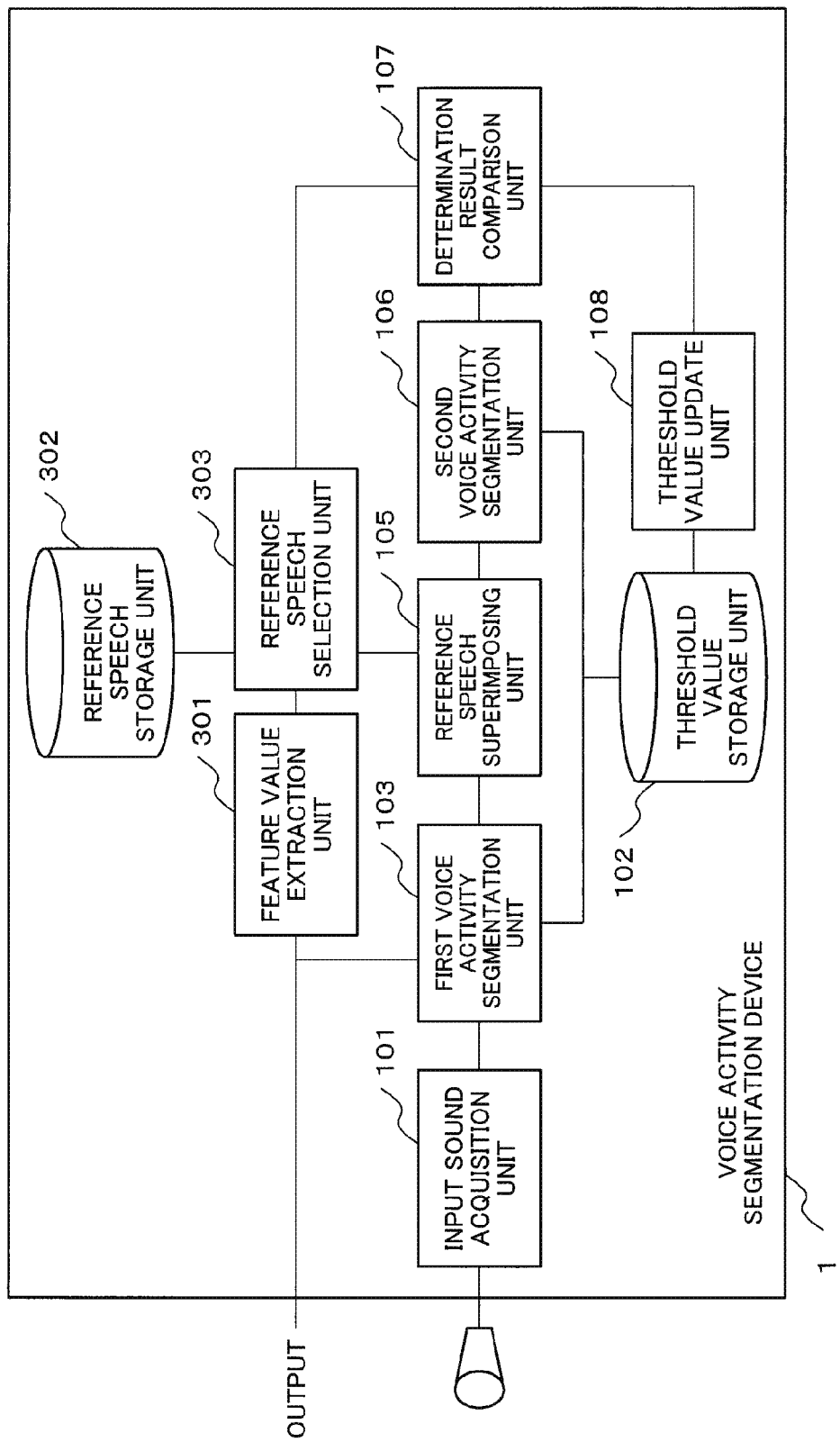
FIG. 6 is a block diagram showing an example of a configuration according to a third exemplary embodiment of the present invention.

FIG. 6 shows configuration according to the third exemplary embodiment of the present invention. With reference to FIG. 6, the voice activity segmentation device 1 according to the third exemplary embodiment of the present invention includes a feature value extraction unit 301, a reference speech storage unit 302 and a reference speech selection unit 303 in addition to the components according to the first exemplary embodiment. Since the each component other than the above-mentioned units is the same as one according to the first exemplary embodiment, description on the same components will be omitted.

The feature value extraction unit 301 is configured so as to find out a feature value which is used for distinguishing the speaker characteristic (personal information which each person has individually) and the acoustic environment on the basis of the time-series of the input sound which is determined as the voice-active segment by the first voice activity segmentation unit 103. Here, the feature value is extracted from the time-series of the input sound. Moreover, spectrum, cepstrum or the like is exemplified as the feature value. For example, it may be preferable that the feature value extraction unit 301 calculates the feature value of the time-series of the input sound for each unit time, and calculates an average value of the feature values over a whole of the voice-active segment.

The reference speech storage unit 302 is realized by a storage apparatus such as an optical disk apparatus, a magnetic disk apparatus or the like. The reference speech storage unit 302 stores a plurality of the reference speeches each of which has a different feature value and which are recorded with different speaker characteristics and in different acoustic environments. Here, the feature value are feature values which is extracted from the time-series of the input sound, such as spectrum, cepstrum or the like, as mentioned above. Here, it may be preferable that the reference speech storage unit 302 associates the reference speech data and its feature value in advance and stores the reference speech data and its feature value in the associated state.

The reference speech selection unit 303 is realized by a dedicated apparatus made of a logic circuit, or by a CPU of an information processing apparatus which carries out a program, etc. The reference speech selection unit 303 is configured so as to select a reference speech which is close to the time-series of the input sound determined as the voice-active segment by the first voice activity segmentation unit 103, out of a plurality of the reference speeches which are stored in the reference speech storage unit 302. In this case, it may be preferable that the reference speech selection unit 303 selects a reference speech which has a feature value closest to the feature value extracted from the time-series of the input sound by the feature value extraction unit 301, out of the reference speeches stored in the reference speech storage unit 302. Moreover, it may be preferable that the reference speech selection unit 303 finds out a degree of similarity between the time-series of the input sound and the reference speech on the basis of a predetermined correlation function, and selects a reference speech whose degree of similarity to the input sound is larger than a predetermined value or indicates being most similar to the input sound. Moreover, it may be preferable that the reference speech selection unit 303 selects a reference speech out of the reference speeches, which are stored in the reference speech storage unit 302, on the basis of a degree of similarity which is calculated by use of another well-known method. A method for calculating the degree of similarity and a method for selecting the reference speech are not limited particularly.

Figure 7:
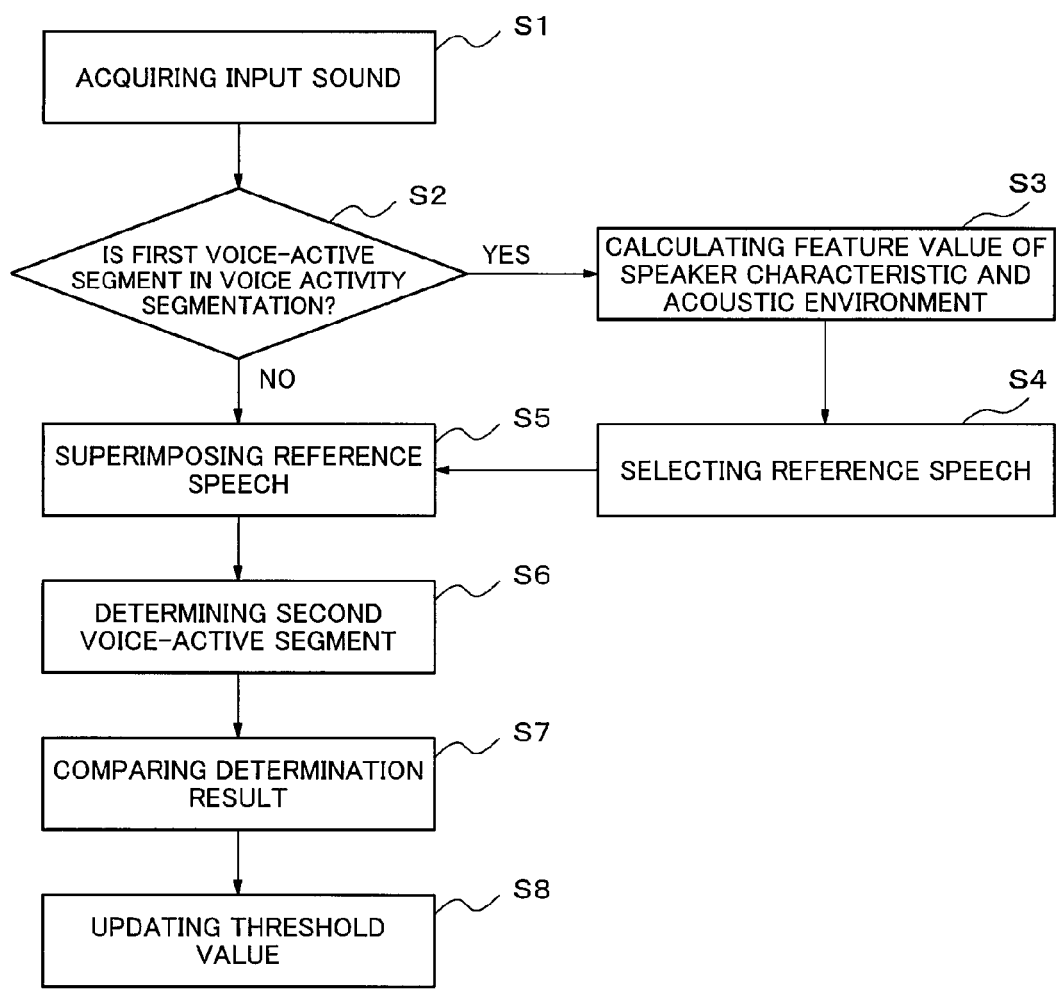
FIG. 7 shows an example of an operation according to the third exemplary embodiment of the present invention.

Next, an operation according to the exemplary embodiment will be described by use of a flow chart shown in FIG. 7. According to the third exemplary embodiment of the present invention, after carrying out up to Step S2 shown in FIG. 2 according to the first exemplary embodiment, a process different from the process according to the first exemplary embodiment is carried out on the basis of the determination result of the first voice activity segmentation unit 103. Specifically, the feature value extraction unit 301 finds out the feature value, which is used for distinguishing the speaker characteristic and the acoustic environment, on the basis of the time-series of the input sound which is determined as the voice-active segment by the first voice activity segmentation unit 103 (Step S3 in FIG. 7). Then, the reference speech selection unit 303 selects the reference speech, which is close to the time-series of the input sound determined as the voice-active segment by the first voice activity segmentation unit 103, out of a plurality of the reference speeches which are stored in the reference speech storage unit 302 (Step S4 in FIG. 7). Since the following steps are similar to the steps according to the first exemplary embodiment, description on the similar steps is omitted.

The voice activity segmentation device 1 according to the exemplary embodiment finds out the feature value, which is used for distinguishing the speaker characteristic and the acoustic environment, on the basis of the time-series of the input sound which is determined as the voice-active segment by the first voice activity segmentation unit 103. Then, the voice activity segmentation device 1 selects the sound, which is close to the time-series of the input sound determined as the voice-active segment, out of a plurality of the reference speeches. As a result, it is possible that the voice activity segmentation device 1 makes the reference speech close to the speaker characteristic which is similar to the user's utterance, and the acoustic environment. Therefore, it is possible that the voice activity segmentation device 1 updates the threshold value more accurately.

Forth Exemplary Embodiment

Next, a fourth exemplary embodiment to carry out the invention will be described.

Figure 8:
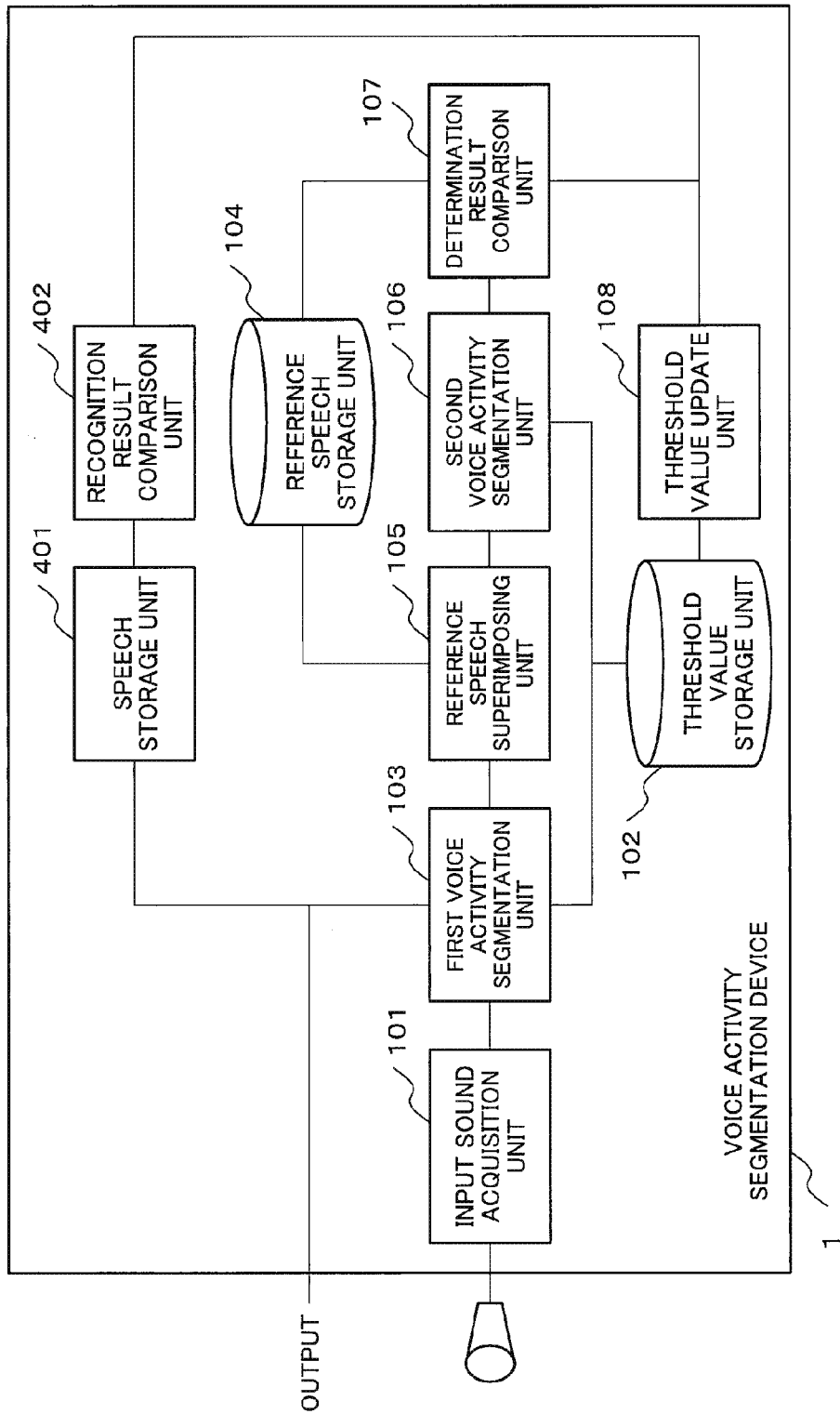
FIG. 8 is a block diagram showing an example of a configuration according to a fourth exemplary embodiment of the present invention.

FIG. 8 shows configuration according to the fourth exemplary embodiment of the present invention. With reference to FIG. 8, the voice activity segmentation device 1 according to the fourth exemplary embodiment of the present invention includes a speech recognition unit 401 and a recognition result comparison unit 402 in addition to the components according to the first exemplary embodiment. Since each component other than the above-mentioned units is the same as one according to the first exemplary embodiment, description on the same components is omitted.

The speech recognition unit 401 is configured so as to carry out speech recognition to the time-series of the input sound which is determined as the voice-active segment by the voice activity segmentation unit 103, and so as to find out a sequence of words, which is corresponding to each the voice-active segment, in the time-series of the input sound.

The recognition result comparison unit 402 compares a degree of consistency (or, degree of discrepancy) between the speech recognition result which is obtained by the speech recognition unit 401, and a segment which is determined to be the voice-active segment by the voice activity segmentation unit 103.

Next, an operation according to the exemplary embodiment will be described with reference to FIG. 9.

Figure 9:
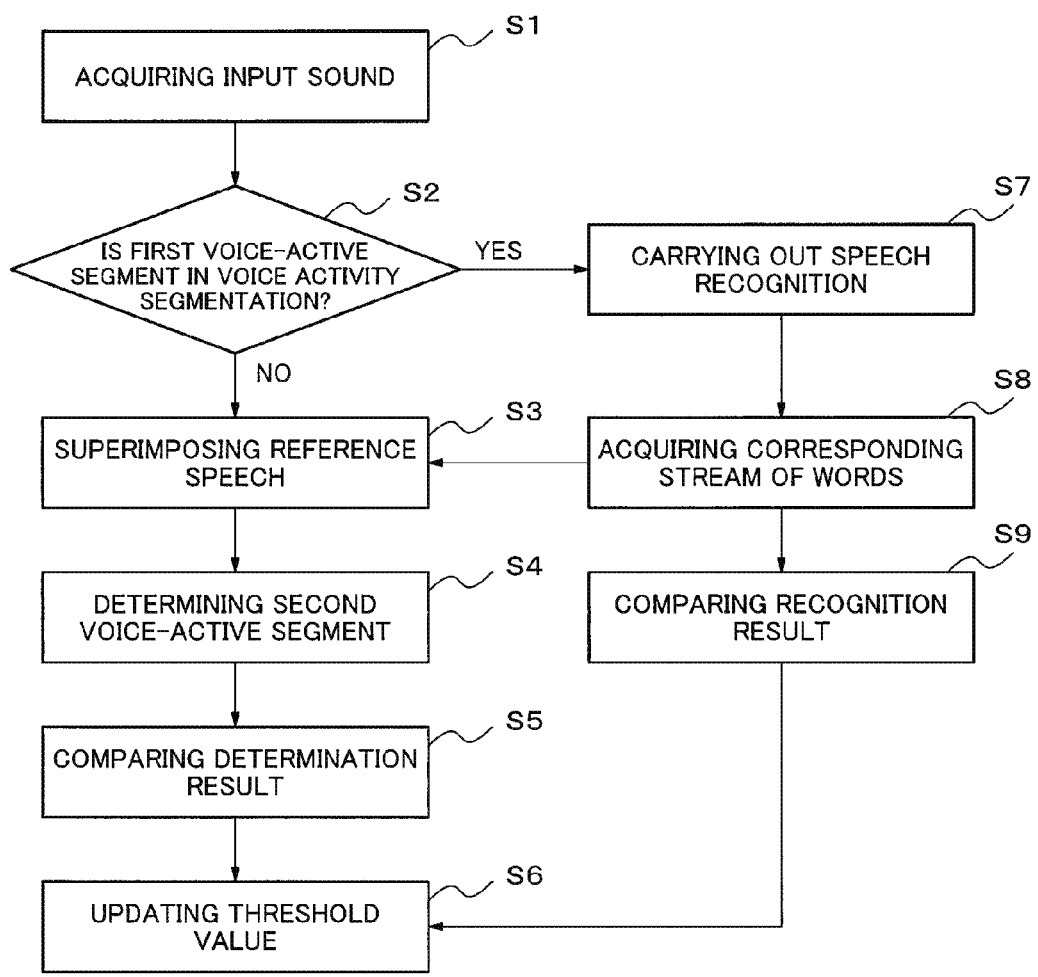
FIG. 9 shows an example of an operation according to the fourth exemplary embodiment of the present invention.

According to the exemplary embodiment, the first voice activity segmentation unit 103 acquires the input sound, and afterward determines the voice-active segment and the voice-inactive segment in the time-series of the input sound (Steps S1 and S2 in FIG. 9). The following process is different according to the determination whether the input sound is the voice-active segment or the voice-inactive segment. In the case of the voice-inactive segment, the voice activity segmentation device 1 carries out the same process as one of Step S3 and the steps after Step S3 in FIG. 2 according to the first exemplary embodiment. On the other hand, in the case of the voice-active segment, the voice activity segmentation device 1 carries out the following process.

The speech recognition unit 401 carries out the speech recognition to the time-series of the input sound which is determined as the voice-active segment, and finds out the sequence of words corresponding to the voice-active segment (Steps S7 and S8 in FIG. 9). Here, when the speech recognition unit 401 carries out the speech recognition, it may be preferable that the speech recognition unit 401 assigns margins just before and just after the time-series of the input sound which is determined as the voice-active segment. According to the example shown in FIG. 3, "ko N ni chi wa" is corresponding to the first voice-active segment, and "ha ya shi de su" is corresponding to the next voice-active segment. In this case, the speech recognition unit 401 determines which extent of the time-series of the input sound the corresponding sequence of words corresponds to, and outputs the correspondence information on the sequence of words, which is the recognition result, to the recognition result comparison unit 402. Next, the recognition result comparison unit 402 compares the acquired correspondence information with the voice-active segment which is determined by the first voice activity segmentation unit 103 (Step S9 in FIG. 9). For example, the recognition result comparison unit 402 carries out the comparison by use of FRR (False Rejection Rate) defined by the (formula 3) or FAR (False Acceptance Rate) defined by the (formula 4). The threshold value update unit 108 updates the threshold value on the basis of the determination result of the second voice activity segmentation unit 106 and the determination result of the recognition result comparison unit 402 (Step S6 in FIG. 9). In this case, it may be preferable that the threshold value update unit 108 updates the threshold value on the basis of the (formula 5) through adopting a determination result, whose FRR or FAR is larger or smaller, out of the determination result of the second voice activity segmentation unit 106 and the determination result of the recognition result comparison unit 402. It may be preferable that the threshold value update unit 108 updates the threshold value by use of average values of those. It is possible to change appropriately a method for updating the threshold value.

Since the voice activity segmentation device 1 according to the exemplary embodiment updates the threshold value, which is related to the voice activity segmentation, by use of the user's speech, it is possible that the voice activity segmentation device 1 updates the threshold value more accurately.

Fifth Exemplary Embodiment

Next, a fifth exemplary embodiment to carry out the invention will be described.

Figure 10:
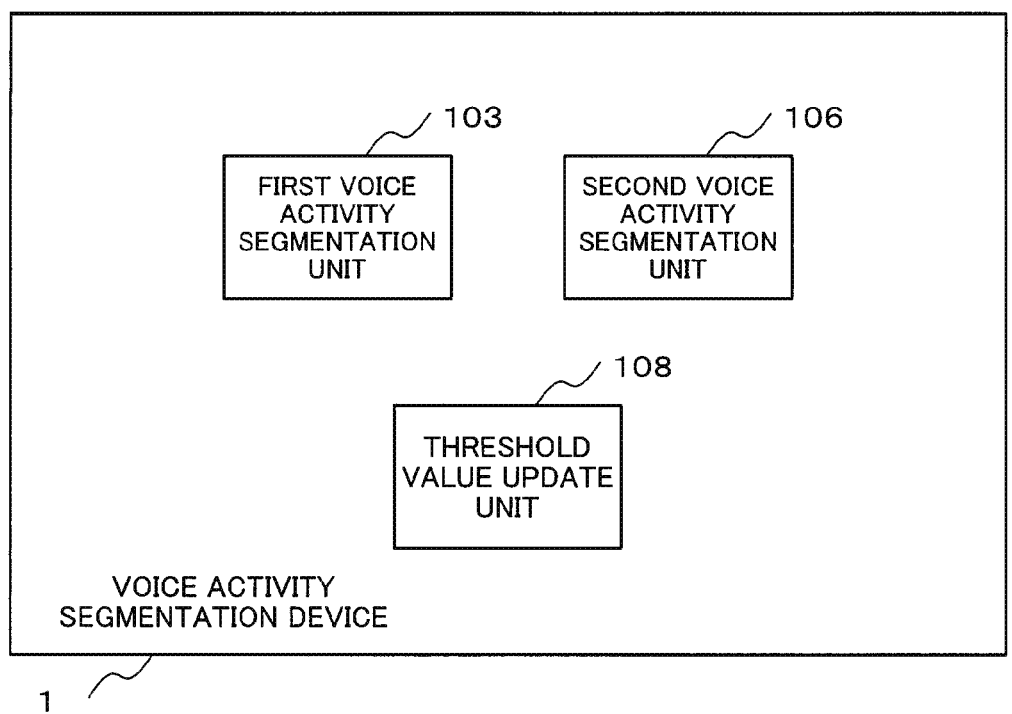
FIG. 10 is a block diagram showing an example of a configuration according to a fifth exemplary embodiment of the present invention.

FIG. 10 shows configuration according to the fifth exemplary embodiment of the present invention. With reference to FIG. 10, the voice activity segmentation device 1 according to the fifth exemplary embodiment of the present invention includes the first voice activity segmentation unit 103, the second voice activity segmentation unit 106 and the threshold value update unit 108. Since the configuration mentioned above is the same as one according to the first exemplary embodiment and an operation according to the exemplary embodiment is the same as one according to the first exemplary embodiment, description on the same component and the same operation is omitted.

By virtue of the configuration, the following voice-active segment device is provided. That is, the voice activity segmentation device is provided including: a first voice activity segmentation means for determining a voice-active segment and a voice-inactive segment in a time-series of input sound by comparing a feature value of the time-series of the input sound and a threshold value; a second voice activity segmentation means for determining, after a reference speech has been superimposed on a time-series of a segment which is determined as the voice-inactive segment by the first voice activity segmentation means, a voice-active segment and a voice-inactive segment in a time-series of the superimposed voice-inactive segment by comparing a feature value acquired from the time-series of the superimposed voice-inactive segment and the threshold value; and a threshold value update means for updating the threshold value on the basis of the determination result of the second voice activity segmentation means.

According to the voice activity segmentation device 1, it is possible to provide the voice activity segmentation device, the voice activity segmentation method, and the voice activity segmentation program which update parameters used in the voice activity segmentation without burdening the user and which are robust against the noise.

While the invention related to the present application has been described with reference to the exemplary embodiment above, the invention related to the present application is not limited to the above-mentioned exemplary embodiment. It is possible to make various changes in form and details, which are able to be understood by a person skilled in the art, within the scope of the present invention.

This application is based upon and claims the benefit of priority from Japanese Patent Application No. 2010-179180, filed on Aug. 10, 2010, the disclosure of which is incorporated herein in its entirety by reference.

(Supplementary Note 1)

A voice activity segmentation device comprising: a first voice activity segmentation means for determining a voice-active segment (first voice-active segment) and a voice-inactive segment (first voice-inactive segment) in a time-series of input sound by comparing a threshold value and a feature value of the time-series of the input sound; a second voice activity segmentation means for determining, after a reference speech acquired from a reference speech storage means has been superimposed on a time-series of the first voice-inactive segment, a voice-active segment and a voice-inactive segment in the time-series of the superimposed first voice-inactive segment by comparing the threshold value and a feature value of the time-series of the superimposed first voice-inactive segment; and a threshold value update means for updating the threshold value in such a way that a discrepancy rate between the determination result of the second voice activity segmentation means and a correct segmentation calculated from the reference speech is decreased.

(Supplementary Note 2)

The voice activity segmentation device according to supplementary note 1 further comprising: a gain and frequency characteristic correction means for correcting a gain or a frequency characteristic of the reference speech, which is superimposed in the first voice-inactive segment, by use of at least either a gain or a frequency characteristic, which is acquired from the time-series of the input sound in the first voice-active segment, so that the gain or the frequency characteristic of the reference speech is equal to the gain or the frequency characteristic respectively, which is acquired from the time-series of the input sound in the first voice-active segment.

(Supplementary Note 3)

The voice activity segmentation device according to any of supplementary note 1 and supplementary note 2 further comprising: a reference speech selection means for selecting a reference speech which has a feature value similar to the feature value of the time-series of the input sound in the first voice-active segment as the reference speech which is superimposed in the first voice-inactive segment, out of a plural reference speeches each of which has a different feature value and which are stored in the reference speech storage means.

(Supplementary Note 4)

The voice activity segmentation device according to any of supplementary note 1 to supplementary note 3 further comprising: a speech recognition means for finding out a segment of a sequence of words which is corresponding to the time-series of the input sound in the first voice-active segment; and a determination result comparison means for determining a discrepancy rate between the first voice-active segment and the segment of the sequence of words which the speech recognition means finds out, wherein the threshold update means updates the threshold value on the basis of the discrepancy rate determined by the determination result comparison means, and the discrepancy rate between the determination of the second voice activity segmentation means and the correct segmentation calculated from the reference speech.

(Supplementary Note 5)

A voice activity segmentation program which makes a computer execute: a first voice activity segmentation step for determining a voice-active segment (first voice-active segment) and a voice-inactive segment (first voice-inactive segment) in a time-series of input sound by comparing a threshold value and a feature value of the time-series of the input sound; a second voice activity segmentation step for determining, after a reference speech acquired from a reference speech storage means has been superimposed on a time-series of the first voice-inactive segment, a voice-active segment and a voice-inactive segment in the time-series of the superimposed first voice-inactive segment are determined by comparing the threshold value and a feature value of the time-series of the superimposed first voice-inactive segment; and a threshold value update step for updating the threshold value in such a way that a discrepancy rate between the determination result obtained in the second voice activity segmentation step and a correct segmentation calculated from the reference speech is decreased.

(Supplementary Note 6)

The voice activity segmentation program according to supplementary note 5 which makes the computer execute furthermore: a step for correcting a gain or a frequency characteristic of the reference speech which is superimposed in the first voice-inactive segment, by use of at least either a gain or a frequency characteristic which is acquired from the time-series of the input sound in the first voice-active segment, so that the gain or the frequency characteristic of the reference speech is equal to the gain or the frequency characteristic respectively, which is acquired from the time-series of the input sound in the first voice-active segment.

(Supplementary Note 7)

The voice activity segmentation program according to any of supplementary note 5 and supplementary note 6 which makes the computer execute furthermore: a step for selecting a reference speech which has a feature value similar to the feature value of the time-series of the input sound in the first voice-active segment, as the reference speech which is superimposed in the first voice-inactive segment, out of a plural reference speeches each of which has a different feature value and which are stored in the reference speech storage means.

(Supplementary Note 8)

The voice activity segmentation program according to any of supplementary note 5 to supplementary note 7 which makes the computer execute:

a speech recognition step for finding out a segment of a sequence of words which is corresponding to the time-series of the input sound in the first voice-active segment; a determination result comparison step for determining a discrepancy rate between the first voice-active segment and the segment of the sequence of words; and the threshold value update step for updating the threshold value on the basis of the discrepancy rate determined in the determination result comparison step, and a discrepancy rate between the determination obtained in the second voice activity segmentation step and the correct segmentation calculated from the reference speech.

(Supplementary Note 9)

A voice activity segmentation method comprising: determining a voice-active segment (first voice-active segment) and a voice-inactive segment (first voice-inactive segment) in a time-series of input sound by comparing a threshold value and a feature value of the time-series of the input sound; determining, after a reference speech acquired from a reference speech storage means has been superimposed on a time-series of the first voice-inactive segment, a voice-active segment and a voice-inactive segment in the time-series of the superimposed first voice-inactive segment by comparing the threshold value and a feature value of the time-series of the superimposed first voice-inactive segment; and updating the threshold value in such a way that a discrepancy rate between the determination result on the voice-active segment and the voice-inactive segment in the time-series of the superimposed first voice-inactive segment, and a correct segmentation calculated from the reference speech is decreased.

(Supplementary Note 10)

The voice activity segmentation method according to supplementary note 9 comprising: correcting a gain or a frequency characteristic of the reference speech which is superimposed in the first voice-inactive segment, by use of at least either a gain or a frequency characteristic which is acquired from the time-series of the input sound in the first voice-active segment, so that the gain or the frequency characteristic of the reference speech is equal to the gain or the frequency characteristic respectively, which is acquired from the time-series of the input sound in the first voice-active segment.

DESCRIPTION OF THE CODES

1 Voice activity segmentation device
101 Input sound acquisition unit
102 Threshold value storage unit
103 First voice activity segmentation unit
104 Reference speech storage unit
105 Reference speech superimposing unit
106 Second voice activity segmentation unit
107 Determination result comparison unit
108 Threshold value update unit
201 Gain and frequency characteristic acquisition unit
202 Gain and frequency characteristic correction unit
301 Feature value extraction unit 302 Reference speech storage unit
303 Reference speech selection unit
401 Speech recognition unit
402 Recognition result comparison unit

What is claimed is:

1. A voice activity segmentation device comprising:
a processor; and a memory,
wherein the memory is configured to store and the processor is configured to implement:
a first voice activity segmentation unit which determines a voice-active segment, which is a first voice-active segment, and a voice-inactive segment, which is a first voice-inactive segment, in a time-series of input sound by comparing a threshold value and a feature value of the time-series of the input sound;
a second voice activity segmentation unit which determines, after a reference speech acquired from a reference speech storage unit has been superimposed on a time-series of the first voice-inactive segment, a voice-active segment and a voice-inactive segment in the time-series of the superimposed first voice-inactive segment by comparing the threshold value and a feature value of the time-series of the superimposed first voice-inactive segment; and
a threshold value update unit which updates the threshold value in such a way that a discrepancy rate between the determination result of the second voice activity segmentation unit and a correct segmentation calculated from the reference speech is decreased.

2. The voice activity segmentation device according to claim 1 further comprising:
a gain and frequency characteristic correction unit which corrects a gain or a frequency characteristic of the reference speech, which is superimposed in the first voice-inactive segment, by use of at least either a gain or a frequency characteristic, which is acquired from the time-series of the input sound in the first voice-active segment, so that the gain or the frequency characteristic of the reference speech is equal to the gain or the frequency characteristic respectively, which is acquired from the time-series of the input sound in the first voice-active segment.

3. The voice activity segmentation device according to claim 1 further comprising:
a reference speech selection unit which selects a reference speech which has a feature value similar to the feature value of the time-series of the input sound in the first voice-active segment as the reference speech which is superimposed in the first voice-inactive segment, out of a plural reference speeches each of which has a different feature value and which are stored in the reference speech storage unit.

4. The voice activity segmentation device according to claim 1 further comprising:
a speech recognition unit which finds out a segment of a sequence of words which is corresponding to the time-series of the input sound in the first voice-active segment; and
a determination result comparison unit which determines a discrepancy rate between the first voice-active segment and the segment of the sequence of words which the speech recognition unit finds out, wherein
the threshold update unit updates the threshold value on the basis of the discrepancy rate determined by the determination result comparison unit, and the discrepancy rate between the determination of the second voice activity segmentation unit and the correct segmentation calculated from the reference speech.

5. A non-transitory computer readable medium storing a voice activity segmentation program which makes a computer execute:
a first voice activity segmentation step for determining a voice-active segment (first voice-active segment) and a voice-inactive segment (first voice-inactive segment) in a time-series of input sound by comparing a threshold value and a feature value of the time-series of the input sound;
a second voice activity segmentation step for determining, after a reference speech acquired from a reference speech storage unit has been superimposed on a time-series of the first voice-inactive segment, a voice-active segment and a voice-inactive segment in the time-series of the superimposed first voice-inactive segment are determined by comparing the threshold value and a feature value of the time-series of the superimposed first voice-inactive segment; and
a threshold value update step for updating the threshold value in such a way that a discrepancy rate between the determination result obtained in the second voice activity segmentation step and a correct segmentation calculated from the reference speech is decreased.

6. The non-transitory computer readable medium according to claim 5 storing the voice activity segmentation program which makes the computer execute furthermore:
a step for correcting a gain or a frequency characteristic of the reference speech which is superimposed in the first voice-inactive segment, by use of at least either a gain or a frequency characteristic which is acquired from the time-series of the input sound in the first voice-active segment, so that the gain or the frequency characteristic of the reference speech is equal to the gain or the frequency characteristic respectively, which is acquired from the time-series of the input sound in the first voice-active segment.

7. The non-transitory computer readable medium according to claim 5 storing the voice activity segmentation program which makes the computer execute furthermore:
a step for selecting a reference speech which has a feature value similar to the feature value of the time-series of the input sound in the first voice-active segment, as the reference speech which is superimposed in the first voice-inactive segment, out of a plural reference speeches each of which has a different feature value and which are stored in the reference speech storage unit.

8. The non-transitory computer readable medium according to claim 5 storing the voice activity segmentation program which makes the computer execute:
a speech recognition step for finding out a segment of a sequence of words which is corresponding to the time-series of the input sound in the first voice-active segment;
a determination result comparison step for determining a discrepancy rate between the first voice-active segment and the segment of the sequence of words; and
the threshold value update step for updating the threshold value on the basis of the discrepancy rate determined in the determination result comparison step, and a discrepancy rate between the determination obtained in the second voice activity segmentation step and the correct segmentation calculated from the reference speech.

9. A voice activity segmentation method comprising:
determining a voice-active segment (first voice-active segment) and a voice-inactive segment (first voice-inactive segment) in a time-series of input sound by comparing a threshold value and a feature value of the time-series of the input sound;

determining, after a reference speech acquired from a reference speech storage unit has been superimposed on a time-series of the first voice-inactive segment, a voice-active segment and a voice-inactive segment in the time-series of the superimposed first voice-inactive segment by comparing the threshold value and a feature value of the time-series of the superimposed first voice-inactive segment; and updating the threshold value in such a way that a discrepancy rate between the determination result on the voice-active segment and the voice-inactive segment in the time-series of the superimposed first voice-inactive segment, and a correct segmentation calculated from the reference speech is decreased.

10. The voice activity segmentation method according to claim 9 comprising:

correcting a gain or a frequency characteristic of the reference speech which is superimposed in the first voice-inactive segment, by use of at least either a gain or a frequency characteristic which is acquired from the time-series of the input sound in the first voice-active segment, so that the gain or the frequency characteristic of the reference speech is equal to the gain or the frequency characteristic respectively, which is acquired from the time-series of the input sound in the first voice-active segment.

* * * * *